United States Patent [19]
Smith

[11] 3,953,082
[45] Apr. 27, 1976

[54] ANTISKID CONTROL SYSTEM

[75] Inventor: Donald L. Smith, Peoria, Ill.

[73] Assignee: Caterpillar Tractor Co., Peoria, Ill.

[22] Filed: Feb. 25, 1974

[21] Appl. No.: 445,065

[52] U.S. Cl. ............................ 303/21 A; 73/510; 188/181 A; 200/61.45 R; 303/21 CG; 303/21 F; 303/24 R
[51] Int. Cl.² .......................................... B60T 8/04
[58] Field of Search .............. 303/21 CG, 21 F, 24, 303/21 A, 21 BE, 21 P; 188/181 A, 181 R; 200/61.45 R, 61.45 M; 73/515, 510

[56] References Cited
UNITED STATES PATENTS

| | | |
|---|---|---|
| 3,311,423 | 3/1967 | Horvath ........................ 303/21 CG |
| 3,322,471 | 5/1967 | Faiver ........................... 303/21 CG |
| 3,447,838 | 6/1969 | Haviland et al. ............... 303/21 CG |
| 3,480,335 | 11/1969 | Ihada ............................ 303/21 CG |
| 3,603,649 | 9/1971 | Wilson .......................... 303/21 CG |
| 3,674,318 | 7/1972 | Hickner et al. ............ 303/21 CG X |

*Primary Examiner*—Duane A. Reger
*Assistant Examiner*—Douglas C. Butler
*Attorney, Agent, or Firm*—Wegner, Stellman, McCord, Wiles & Wood

[57] ABSTRACT

An antiskid braking system in which a wheel deceleration sensor interrupts brake actuation when deceleration of the wheel exceeds a selected value. The wheel deceleration sensor has a sensitivity that is varied in accordance with the braking force utilized.

8 Claims, 2 Drawing Figures

ANTISKID CONTROL SYSTEM

SUMMARY OF THE INVENTION

This invention is concerned with an antiskid braking system which is responsive to the braking force utilized, compensating for the condition of the road surface.

Antiskid vehicle braking systems have been proposed which sense wheel deceleration and release the brake when deceleration is excessive. A common deceleration sensor is an inertial mass mounted on a rotating shaft coupled to the wheel. As the wheel and shaft decelerate when the wheel is braked, the mass tends to continue rotating and a cam connection between the mass and the shaft causes it to move axially. If the deceleration exceeds the value for which the sensor is designed, the braking action is interrupted and the wheel released. The brakes are repeatedly applied for short intervals, gradually slowing the vehicle without the danger of a skid. Examples are found in Horvath 3,401,987, Haviland 3,447,838, Inada 3,480,335 and a publication entitled "Automatic Brake Control For Trucks — What Good Is It?", publication 680591 of the Society of Automotive Engineers.

A shortcoming of these systems is that safe wheel deceleration is not an absolute value, but depends on variables such as the road surface condition, or more specifically the coefficient of friction between the wheel and the road surface. For example, a vehicle on a dry road can decelerate safely at the order of 0.7 or 0.8 g. On a slippery road, deceleration should not exceed 0.2 or 0.3 g. Horvath 3,311,423 and Faiver et al. 3,322,471 have suggested modifying the action of the wheel deceleration sensor in accordance with the linear deceleration of the vehicle.

The present invention utilizes the braking force applied by the operator to establish the permissible deceleration. When a high level braking force is applied, the wheel deceleration may be greater than when a low braking pressure is applied. For example, on a dry road, high wheel deceleration is safe and a substantial braking pressure may be utilized. With a slippery road surface, even a small braking pressure may cause a high wheel deceleration and the brakes will be released before a high braking pressure can be applied.

One feature of the invention is the provision of a wheel deceleration sensor which has a shaft rotatable with the wheel, with an inertial mass thereon. The mass is movable axially of the shaft in response to deceleration of the wheel. A spring restrains the mass from axial movement and means are provided for adjusting the spring to vary the restraining force on the mass.

Another feature of the invention is a vehicle braking system including means for applying a braking force to a wheel, means for sensing deceleration of the wheel, means responsive to the braking force to establish a threshold deceleration and means responsive to a deceleration in excess of the threshold to interrupt application of the braking force.

A further feature is that axial movement of the inertial mass is restrained by a coil spring seated in a cup and the cup is moved to change the spring pressure by a piston responsive to the braking pressure.

Yet another feature is that a bearing is provided between the spring and the inertial mass.

Still a further feature is that mechanical stops limit both the compression of the spring and axial movement of the inertial mass.

And another feature is that axial movement of the mass is detected by an adjustably mounted switch, the position of which establishes the deceleration limit.

Further features and advantages of the invention will readily be apparent from the following specification and from the drawings.

DESCRIPTION OF THE PREFERRED EMBODIMENT

Figure 1:
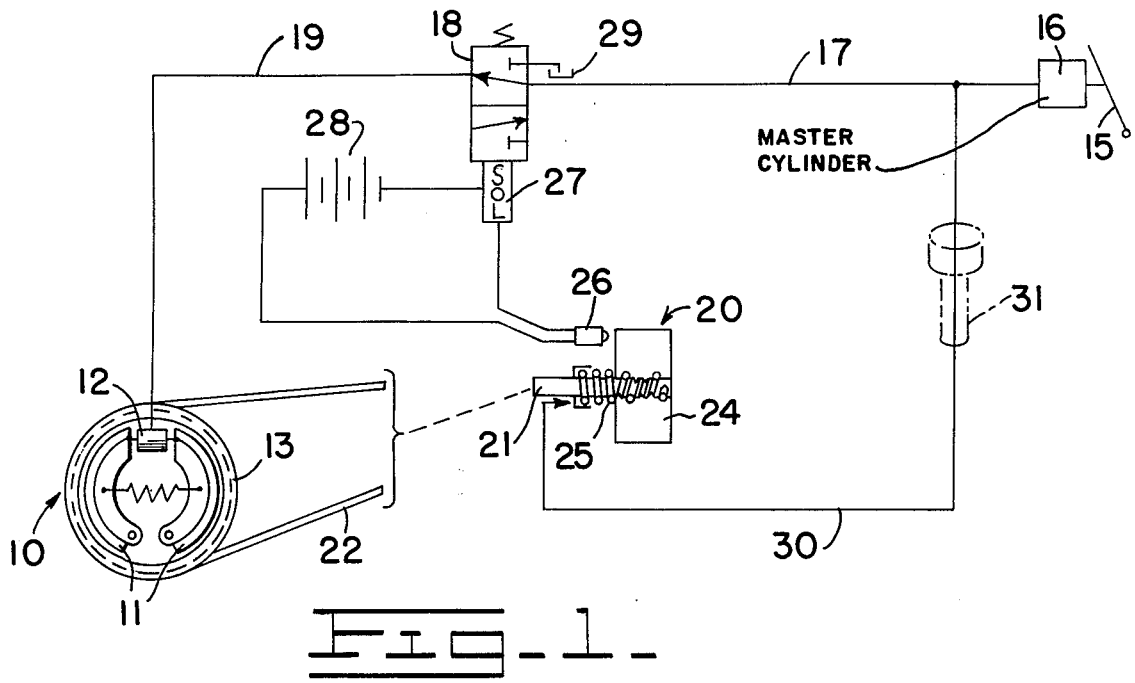
FIG. 1 is a diagram of a braking system incorporating the invention.

In the diagrammatic illustration of the system, vehicle wheel 10 has brake shoes 11 actuated by a wheel cylinder 12 to engage a brake drum 13 and slow the wheel. The vehicle operator brakes the vehicle by depressing brake pedal 15 which is connected mechanically with the master cylinder 16. The wheel cylinder 12 is connected with master cylinder 16 through a fluid line 17, control valve 18 and line 19. The force with which the operator depresses pedal 15 establishes the pressure of the fluid, as a suitable oil, communicated to wheel cylinder 12 and thus the braking force applied to the wheel 10. The wheel cylinder of each braked wheel of the vehicle is connected with master cylinder 16 through a separate control valve, in the manner illustrated.

A wheel deceleration sensor 20 has a shaft 21 connected through drive belt 22 with wheel 10. An inertial mass 24 is mounted on shaft 21 and rotates with it while the wheel turns. As will appear in more detail below, when wheel 10 and shaft 21 decelerate as a result of braking action, mass 24 tends to continue rotating and is caused to move axially of the shaft toward the left as viewed in FIG. 1, against a restraining spring 25. The extent of the axial movement of the mass depends on the rate of deceleration. If the deceleration is excessive, the mass moves far enough to actuate switch 26 connected in a circuit with control valve operating solenoid 27 and battery 28. When the switch is actuated, the solenoid changes the position of valve 18, interrupting the fluid connection from master cylinder 16 to wheel cylinder 12 and connecting the wheel cylinder and line 19 with a drain 29, releasing the brake.

A fluid line 30 connected with master cylinder 16 applies a biasing force to restraining spring 25 as indicated diagrammatically in FIG. 1. The restraining action of the spring on inertial mass 24 varies directly with the braking pressure exerted by the vehicle operator. The effect of the variation in sensitivity of the deceleration sensor can be appreciated by considering the action of the system under different operating conditions. In order that the sensor respond to a low level of wheel deceleration and provide skid control with a slippery operating surface, it is necessary that the sensor respond to a low level of deceleration. When the brakes are applied in this situation, the wheel will decelerate rapidly and the deceleration limit will be reached releasing the brake before the operator can apply a high braking pressure. Conversely, if the vehicle is operating on a dry surface, the wheel will not decelerate as rapidly. This permits the pressure applied by the operator to build up, increasing the restraint on the inertial mass 24 so that a greater deceleration can be utilized without actuating the sensor and releasing the brake.

The system may be adapted for use on a vehicle employing an air brake system by substituting an air valve for the hydraulic valve 18 and converting the air pressure to a hydraulic pressure for biasing restraining spring 25, as with a roto-chamber converter illustrated in broken lines at 30.

Figure 2:
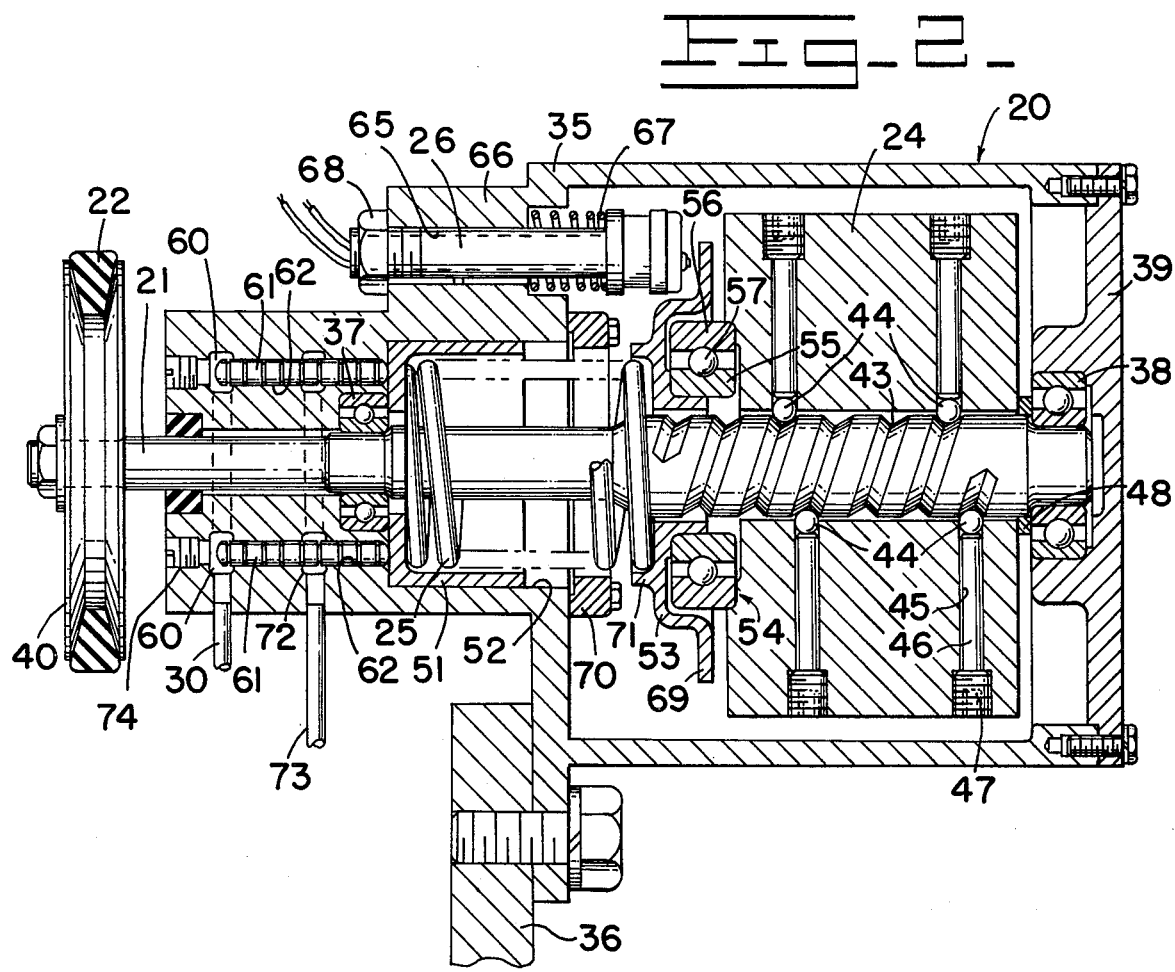
FIG. 2 is a longitudinal section through the wheel deceleration sensor.

The structure of deceleration sensor 20 is illustrated in FIG. 2. A cylindrical housing 35 is secured to a suitable mounting 36 on the vehicle frame. Shaft 21 is journaled in a bearing 37 at the left end of the housing and a bearing 38 in housing end plate 39. Pulley 40, mounted on the end of shaft 21, is driven with wheel 10 by belt 22. The right end of shaft 21, as viewed in FIG. 2, has a spiral groove 43 therein which receives balls 44 that are carried in radial passages 45 of inertial mass 24. Ball retaining rods 46 are held in the passages by screws 47.

Shaft 21 is driven by wheel 10 in a clockwise direction as viewed from the left of FIG. 2. While the wheel is running, inertial mass 24 is positioned at the right of shaft 21, against spacer ring 48 and turns with the shaft. When the wheel and shaft 21 decelerate during braking, inertial mass 24 tends to continue rotating and is moved axially of shaft 21 to the left by the action of balls 44 in cam groove 43 and against the resistance of restraining spring 25.

Restraining spring 25 surrounds shaft 21 and is seated in a cup 51 slidably received in bore 52 of the housing. The other end of the restraining spring bears against retainer plate 53 which is isolated from rotating inertial mass 24 by a bearing assembly 54. The inner race 55 is carried by retainer plate 53 while the outer race 56 is mounted on the end of inertial mass 24. The races are joined by balls 57.

The braking pressure is connected through fluid line 30 to a cavity 60 where it acts on the ends of a pair of pistons 61 slidable in longitudinally extending bores 62 and bearing against the end of cup 51. As brake pressure increases, the pistons 61 move to the right compressing spring 25 and increasing the restraint to axial movement of inertial mass 24.

Switch 26 is mounted in a bore 65 in the wall 66 of housing 35, and is adjustable parallel with the axis of shaft 21. A spring 67 urges the switch inwardly of the housing and its position is determined by retaining nut 68 threaded to the outside of the switch body. The switch is actuated by an outwardly extending flange 69 on retainer plate 53. The position of switch 26 is adjusted with restraining spring 25 fully expanded to establish the minimum wheel deceleration which will be sensed.

A stop ring 70 limits the movement of spring bearing cup 51 to the right and thus limits the compression of spring 25 and the maximum wheel deceleration which may occur without releasing the brake. A rib 71 on the left face of retainer plate 53 engages the other face of stop ring 70 limiting the movement of the inertial mass 24 to the left. Leakage past pistons 61 is collected in cavities 72 and returned to master cylinder 16 reservoir, via drain line 73, thus preventing leakage into housing 35. The pressurized ends of the bores 62 are blocked by plugs 74.

I claim:

1. A wheel deceleration sensor for a vehicle wheel having a variable force, operator actuated brake, comprising:
    a shaft rotatable with said wheel;
    an inertial mass rotatable with said shaft and movable axially thereof in response to deceleration of the shaft in excess of the deceleration of the mass;
    a spring restraining said mass from axial movement with respect to said shaft;
    means responsive to the force with which the operator actuates the brake to vary the restraint on axial movement of the mass directly as a function of the braking force applied by the operator; and
    means responsive to axial movement of the mass to indicate excessive wheel deceleration.

2. The vehicle wheel deceleration sensor of claim 1 including means responsive to a selected axial movement of the inertial mass to release the brakes on said wheel, the excessive wheel deceleration required to release the brake being directly related to the braking force applied by the operator.

3. The vehicle wheel deceleration sensor of claim 1 including stop means limiting the adjustment of said spring.

4. The vehicle wheel deceleration sensor of claim 1 wherein said spring is a coil spring spaced axially from said mass, and including a ball bearing assembly with two races joined by balls, interposed between the spring and a mass, one race being fixed to the spring and the other fixed to the mass.

5. The vehicle wheel deceleration sensor of claim 4 including a retainer plate between said spring and said ball bearing assembly.

6. The vehicle wheel deceleration sensor of claim 5 including a stop ring engaged by said retainer plate to limit axial movement of the mass in response to shaft deceleration.

7. The vehicle wheel deceleration sensor of claim 1 in which said spring is a coil spring, and including a cup with the end of the spring remote from the mass seated therein, and a piston bearing against said cup and responsive to fluid pressure to compress the spring and adjust the axial restraining force on said mass.

8. The vehicle wheel deceleration sensor of claim 7 including a stop ring engaged by said cup to limit the compressive force applied to said spring.

* * * * *